(12) United States Patent
Yang et al.

(10) Patent No.: US 10,249,870 B2
(45) Date of Patent: Apr. 2, 2019

(54) ELECTRODE SHEET FOR LI-ION BATTERY AND LI-ION BATTERY INCLUDING THE SAME

(71) Applicant: Contemporary Amperex Technology Co., Limited, Ningde, Fujian Province (CN)

(72) Inventors: Jiandong Yang, Ningde (CN); Wei Li, Ningde (CN); Haizu Jin, Ningde (CN); Yu Luo, Ningde (CN); Yongshou Lin, Ningde (CN); Kai Wu, Ningde (CN)

(73) Assignee: CONTEMPORARY AMPEREX TECHNOLOGY CO., LIMITED (CN)

( * ) Notice: Subject to any disclaimer, the term of this patent is extended or adjusted under 35 U.S.C. 154(b) by 166 days.

(21) Appl. No.: 15/409,384

(22) Filed: Jan. 18, 2017

(65) Prior Publication Data
US 2017/0214036 A1    Jul. 27, 2017

(30) Foreign Application Priority Data

Jan. 22, 2016   (CN) .................... 2016 2 0065363 U

(51) Int. Cl.
| | |
|---|---|
| *H01M 4/02* | (2006.01) |
| *H01M 4/13* | (2010.01) |
| *H01M 2/18* | (2006.01) |
| *H01M 4/66* | (2006.01) |
| *H01M 10/0525* | (2010.01) |
| *H01M 4/70* | (2006.01) |

(52) U.S. Cl.
CPC ............... *H01M 4/13* (2013.01); *H01M 2/18* (2013.01); *H01M 4/661* (2013.01); *H01M 4/70* (2013.01); *H01M 10/0525* (2013.01)

(58) Field of Classification Search
CPC ...................................................... H01M 2/00
See application file for complete search history.

(56) References Cited

U.S. PATENT DOCUMENTS

2016/0260998 A1* 9/2016 Eo .................... H01M 2/263

* cited by examiner

*Primary Examiner* — Jacob B Marks
(74) *Attorney, Agent, or Firm* — Tarolli, Sundheim, Covell & Tummino LLP

(57) ABSTRACT

The present application relates to an electrode sheet for Li-ion battery and a Li-ion battery including the same. The Li-ion battery includes a current collector and a diaphragm layer coated on the current collector, the current collector includes a coating region and at least one electrode tab region, the coating region is a region of the current collector coated with the diaphragm layer; the coating region is adjoined with the electrode tab region, a stress releasing region is provided at adjoining position of the coating region and at least one electrode tab region. The stress releasing region provided by the present application can reduce stress received by the diaphragm during rolling and stretching processes, which can avoid cracking of electrode tab and electrode sheet, and can improve battery cycling performance and, at the same time, can also be fused in short circuit, thereby improving safety performance of the battery.

9 Claims, 3 Drawing Sheets

ELECTRODE SHEET FOR LI-ION BATTERY AND LI-ION BATTERY INCLUDING THE SAME

CROSS-REFERENCE TO RELATED APPLICATIONS

The present application claims priority to Chinese Patent Application No. 201620065363.8, filed on Jan. 22, 2016, the content of which is incorporated herein by reference in its entirety.

TECHNICAL FIELD

The present application relates to the field of new batteries and, particularly, relates to an electrode sheet for a Li-ion battery and a Li-ion battery including the electrode sheet.

BACKGROUND

A Li-ion battery used for electric vehicle mainly includes a positive electrode diaphragm, a negative electrode diaphragm, an insulating film, electrolyte, a mechanical structure and other auxiliary structures. The design of negative and positive diaphragm is a multi-electrode-tab design. The structure of the electrode sheet is mainly a solid-core structure, however, the electrode tab of such a structure may have the problems of diaphragm cracking and diaphragm deformation during use of the battery, meanwhile, during cycling process of the battery, the deformation may also cause that the negative electrode and the positive electrode are not fitted tightly, the interface is poor, the performance is bad etc. For a Li-ion battery processed by coiling, the positive and negative electrode sheets are characterized by long and thin, and the material is soft, which is easily broken during processing, particularly, during the rolling and coiling process of the electrode sheet. Generally, during preparation process of an electrode sheet, firstly, coating a layer of active material at the center of a current collector, leaving uncoated regions at the side edges, preforming die cutting on uncoated regions to generate a multi-electrode-tab structure, then rolling the electrode sheet. However, due to different extensibility of the material region and no-material region, during the sheet pressing or coiling process, a stress concentration region may be generated in the coating region and the electrode tab region, the electrode sheet is easily folded or even broken, leading to damage of the electrode sheet or safety problems.

Aiming at the problems in the prior art, the present application is proposed

SUMMARY

The present application provides an electrode sheet for a Li-ion battery, so as to solve the problems of diaphragm cracking and poor performance during cycling process of the battery.

A first aspect of the present application provides an electrode sheet for a Li-ion battery, including a current collector and a diaphragm layer which is coated on the current collector, the current collector includes a coating region 1 and at least one electrode tab region 2, the coating region is a region of the current collector which is coated with the diaphragm layer; the coating region 1 is adjoined with the electrode tab region 2, at least one stress releasing region is arranged at an adjoining position of the coating region 1 and the at least one electrode tab region 2.

Preferably, the stress releasing region is a groove 3 or a through-hole 4 provided at the adjoining position.

Preferably, a plurality of stress releasing regions are provided at a single adjoining position, at least one adjoining position is provided with a plurality of stress releasing regions.

Preferably, the adjoining position provided with the stress releasing region and the adjoining position without the stress releasing region are alternatively arranged.

Preferably, a shape of the stress releasing region is circular, oval or polygonal.

Preferably, at least one corner of the polygon is a chamfer or a fillet.

Preferably, a total area of the stress releasing region is 5%~50% of an area of the electrode tab region.

Preferably, a maximum vertical distance between a point on an edge of the stress releasing region and the adjoining position is less than a width of the electrode tab.

Preferably, the current collector of the electrode sheet is a copper foil or an aluminum foil.

A second aspect of the present application provides a Li-ion battery, including the electrode sheet of the present application.

The technical solution provided by the present application can reach the following beneficial effects:

The present application aims at the problem existing in the using process of a battery of multiple electrode tabs, and designs an electrode sheet for a Li-ion battery which can solve the problems of diaphragm cracking and poor performance during cycling process of the battery. The improvement lies in that the stress releasing region provided can reduce the stress received by the electrode sheet during the processes of rolling and stretching, which can cushion the stretching suffered by the electrode tab and the electrode sheet during processing and using, so that the deformation of the electrode tab and the electrode sheet will be concentrated in the stress releasing region. The electrode sheet of such design can significantly improve machinability of the electrode sheet and the cycle life of the battery and, at the same time, can also be fused when short circuit occurs, so as to improve safety performance of the battery.

It should be understood that, the above general description and the following detailed description are just exemplary, which cannot limit the present application.

REFERENCE SIGNS

Figure 1:
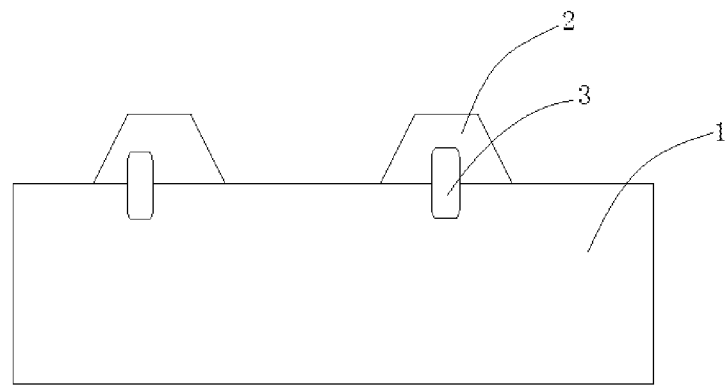
FIG. 1 is a structural schematic diagram of an electrode sheet for a battery provided by an embodiment of the present application.

1—coating region;
2—electrode tab region;
3—groove;
4—through-hole.

The accompanying drawings are incorporated into the specification and constitute as a part of the specification, which shows embodiments of the present application and are used to explain the principle of the present application together with the specification.

DESCRIPTION OF EMBODIMENTS

The present application will be described in further detail through specific embodiments and the accompanying drawings. The "front", "back", "left", "right", "up", "down" are referring to the placing states of an electrode sheet for a Li-ion battery and a Li-ion battery using the electrode sheet as shown in the drawings.

Figure 4:
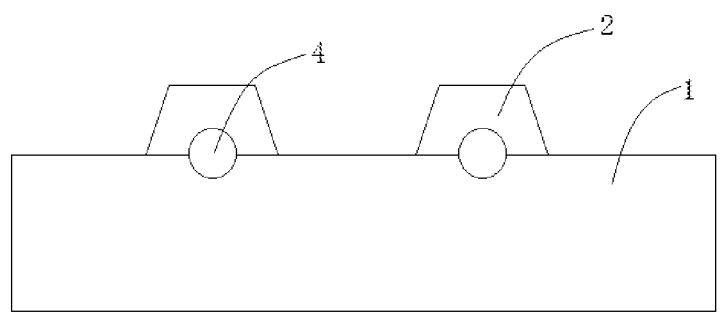
FIG. 4 is a structural schematic diagram of an electrode sheet for a battery provided by still another embodiment of the present application.

As shown in FIG. 1 or FIG. 4, an embodiment of the present application provides an electrode sheet for a Li-ion battery, including a current collector and a diaphragm layer coated on the current collector, the current collector includes a coating region 1 and at least one electrode tab region 2, the coating region is a region of the current collector which is coated with the diaphragm layer; the coating region 1 is adjoined with the electrode tab region 2, a stress releasing region is provided at the adjoining position of the coating region 1 and at least one electrode tab region 2, the stress releasing region is a groove 3 or a through-hole 4 provided at the adjoining position. In FIG. 1, the region 3 is a groove with a thickness smaller than the neighboring regions; in FIG. 4, the region 4 is a through-hole. Comparing to the through-hole, providing a groove as the stress releasing region brings more advantages to increasing the strength of the electrode tab.

Figure 2:
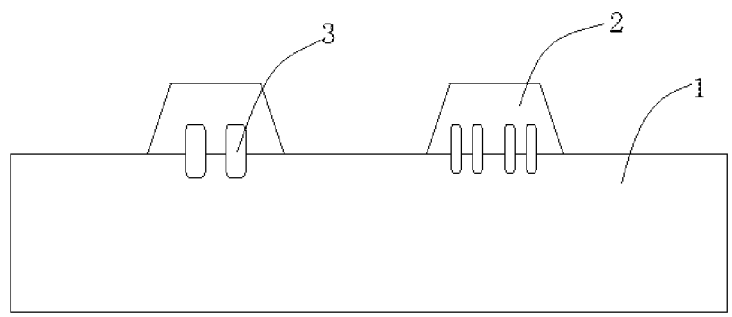
FIG. 2 is a structural schematic diagram of an electrode sheet for a battery provided by another embodiment of the present application.

As shown in FIG. 2, in another embodiment, multiple stress releasing regions are provided at a single adjoining position, the number of adjoining position provided with multiple stress releasing regions is one or more, so as to absorb stress more uniformly.

Figure 3:
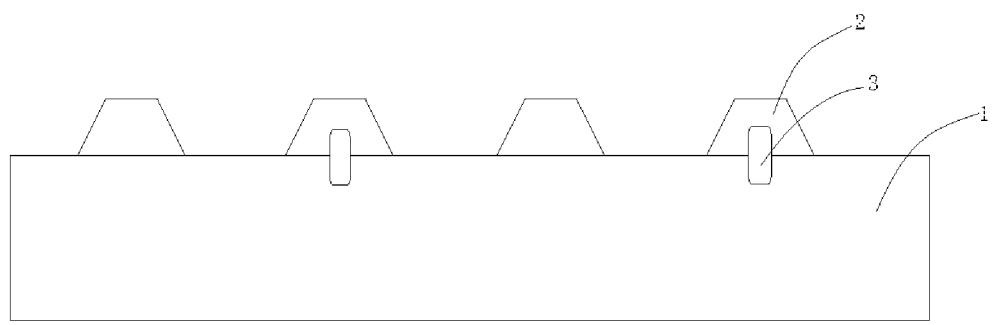
FIG. 3 is a structural schematic diagram of an electrode sheet for a battery provided by still another embodiment of the present application.

As shown in FIG. 3, in still another embodiment, when the multiple electrode tab regions are provided on the current collector, the electrode tab region provided with the stress releasing region and the electrode tab region without the stress releasing region are alternatively arranged. When the electrode sheet is relatively small, and the distance between the electrode tabs is relatively narrow, the alternative arrangement can release the stress, thus can improve the strength of the electrode tab and the energy density of the battery.

Figure 5:
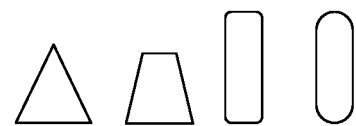
FIG. 5 is a schematic diagram of shape of a stress releasing region provided by an embodiment of the present application.

In the above-mentioned embodiment, as shown in FIG. 5, the shape of the stress releasing region is circular, oval or polygonal, in which oval and circular are preferred.

Figure 6:
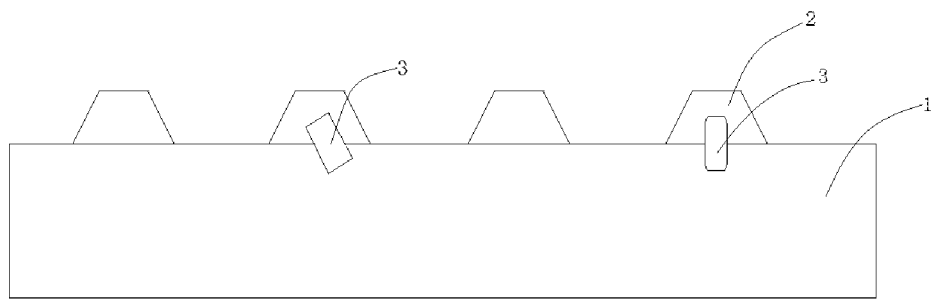
FIG. 6 is a structural schematic diagram of an electrode sheet for a battery provided by still another embodiment of the present application.

As shown in FIG. 6, when the stress releasing region is of a strip shape, such as oval or rectangle, the length direction or the long axis direction of the stress releasing region can be provided perpendicularly to the adjoining position of the coating region and the electrode tab region, and also can be provided in an inclined way at the adjoining position of the coating region and the electrode tab region.

Further, preferably, at least one corner of a polygon is a chamfer or fillet, when the shape of the stress releasing region is polygon, in order to avoid a too large stress at a sharp corner, the polygon is designed to be with a chamfer and/or a fillet, which can maximally decrease generation of the stress.

In the above-mentioned embodiments, total area of the stress releasing region is 5%~50% of the area of the electrode tab region. The stress releasing effect is not good if the area is too small, the strength of electrode tab will decrease and the electrode tab may be broken easily if the area is too large. When the stress releasing region is a groove, depth of the groove is at least ½ of the thickness of the current collector, if the depth of the groove is too small, then the stress absorbing ability is not sufficient.

Figure 7:
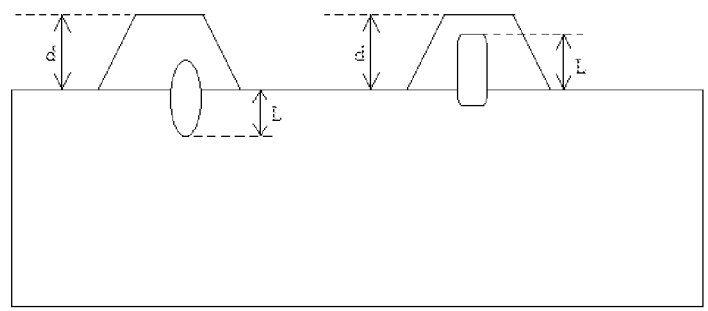
FIG. 7 is a schematic diagram showing width d of an electrode tab, distance L of an adjoining position of a stress releasing region in an electrode tab of a battery provided by an embodiment of the present application.

In the above-mentioned embodiments, a preset distance is provided between the stress releasing region and the adjoining positions of the coating region and the electrode tab region, the maximum vertical distance L between a point on an edge of the stress releasing region and the adjoining position is less than width d of the electrode tab. The width d refers to a distance between a side of the electrode tab region which is parallel to the adjoining position and the adjoining position (i.e., when the electrode tab region is a rectangle or a trapezoid), or the maximum vertical distance between a point on an edge of the electrode tab and the adjoining position (when the edge of the electrode tab region is an arc), which is specifically shown in FIG. 7.

Preferably, the shape of the electrode tab is an isosceles trapezoid, the isosceles trapezoid and the electrode sheet form a 120~200 degree angle, in this situation, width of the electrode tab refers to the height of the isosceles trapezoid. If the distance is too large, the battery capacity as well as the battery strength will be decreased, leading to that the electrode tab is easily broken and, at the same time, is disadvantage on subsequent welding of electrode tabs.

In the above-mentioned embodiments, the current collector of the electrode sheet is copper foil or aluminum foil.

A Li-ion battery is proposed according to the second aspect of the present application, the Li-ion battery includes the electrode sheet of the present application, and is preferably applied to the negative electrode of the battery. The Li-ion battery includes a positive electrode sheet, a negative electrode sheet, an insulating film, electrolyte, and other auxiliary structures. At least one of the positive electrode sheet and the negative electrode sheet is the electrode sheet according to the present application. Since the electrode sheet of the present application is adopted, there is no diaphragm deformation during use of the battery, the negative electrode and the positive electrode will be fitted tightly, the interface is good, and having a good cycling performance.

According to the above principle, further appropriate alterations and modifications can be made to the above-mentioned embodiments of the present application. Therefore, the present application will not be limited by the specific embodiments disclosed and described above, modifications and alterations to the present application should also fall in the protection scope of the claims of the present application. Besides, although the present specification uses some specific terms, however, these terms are only for ease of illustration, which will not limit the present application.

What is claimed is:

1. An electrode sheet for a Li-ion battery, comprising a current collector and a diaphragm layer coated on the current collector, the current collector comprises a coating region (1) and at least one electrode tab region (2), the coating region is a region of the current collector which is coated with the diaphragm layer; characterized in that, the coating region (1) is adjoined with the electrode tab region (2), at least one stress releasing region is provided at an adjoining position of the coating region (1) and the at least one electrode tab region (2), and the stress releasing region is a groove (3) or a through-hole (4) provided at the adjoining position.

2. The electrode sheet for a Li-ion battery according to claim 1, characterized in that, a plurality of stress releasing regions are provided at a single adjoining position, at least one adjoining position is provided with a plurality of stress releasing regions.

3. The electrode sheet for a Li-ion battery according to claim 1, characterized in that, the adjoining position provided with the stress releasing region and the adjoining position without the stress releasing region are alternatively arranged.

4. The electrode sheet for a Li-ion battery according to claim 1, characterized in that, a shape of the stress releasing region is circular, oval or polygon.

5. The electrode sheet for a Li-ion battery according to claim 4, characterized in that, at least one corner of the polygon is a chamfer or a fillet.

6. The electrode sheet for a Li-ion battery according to claim 1, characterized in that, a total area of the stress releasing region is 5%~50% of an area of the electrode tab region.

7. The electrode sheet for a Li-ion battery according to claim 1, characterized in that, a maximum vertical distance between a point on an edge of the stress releasing region and the adjoining position is less than a width of the electrode tab.

8. The electrode sheet for a battery according to claim 1, characterized in that, the current collector of the electrode sheet is a copper foil or an aluminum foil.

9. A Li-ion battery, characterized in that, the Li-ion battery comprises the electrode sheet for a Li-ion battery according to claim 1.

* * * * *